United States Patent
Agrawal et al.

(10) Patent No.: US 12,306,705 B2
(45) Date of Patent: May 20, 2025

(54) RECURRING ALARM DETECTION SYSTEM AND METHOD OF USING

(71) Applicant: RAKUTEN SYMPHONY, INC., Tokyo (JP)

(72) Inventors: Nimit Agrawal, Madhya Pradesh (IN); Akash Soni, Madhya Pradesh (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 17/755,227

(22) PCT Filed: Mar. 25, 2022

(86) PCT No.: PCT/US2022/021856
§ 371 (c)(1),
(2) Date: Apr. 25, 2022

(87) PCT Pub. No.: WO2023/183001
PCT Pub. Date: Sep. 28, 2023

(65) Prior Publication Data
US 2024/0160515 A1    May 16, 2024

(51) Int. Cl.
*G06F 11/00*    (2006.01)
*G06F 11/07*    (2006.01)

(52) U.S. Cl.
CPC ...... *G06F 11/0781* (2013.01); *G06F 11/0793* (2013.01)

(58) Field of Classification Search
CPC .......................... G06F 11/0781; G06F 11/0793
See application file for complete search history.

(56) References Cited

U.S. PATENT DOCUMENTS

| | | | |
|---|---|---|---|
| 7,945,817 B1 | 5/2011 | Usery et al. | |
| 10,896,073 B1 * | 1/2021 | Jain | G06F 11/0793 |
| 2005/0091356 A1 * | 4/2005 | Izzo | H04L 41/0604 |
| | | | 709/223 |
| 2011/0141913 A1 * | 6/2011 | Clemens | H04L 41/0681 |
| | | | 370/242 |
| 2017/0039530 A1 * | 2/2017 | Natu | G06F 11/008 |
| 2019/0340241 A1 * | 11/2019 | Ganesan | G06F 40/247 |
| 2022/0317674 A1 * | 10/2022 | Sahaf | G05B 23/0272 |

* cited by examiner

*Primary Examiner* — Joshua P Lottich
(74) *Attorney, Agent, or Firm* — HAUPTMAN HAM, LLP (57) ABSTRACT

A system for identifying recurring alarms includes a non-transitory computer readable medium configured to store instructions; and a processor. The processor is configured to execute the instructions for correlating an alarm log with a rule, the alarm log includes information related to a plurality of faults. The processor is configured to execute the instructions for determining whether any of the plurality of faults satisfy criteria of the rule; and identifying an earliest fault of the plurality of faults that satisfies all of the criteria of the rule in response to a determination that at least one fault of the plurality of faults satisfies all of the criteria of the rule. The processor is configured to execute the instructions for comparing the earliest fault with an incident log; and generating an incident in response to a determination that the earliest fault does not match any open entry in the incident log.

20 Claims, 3 Drawing Sheets

RECURRING ALARM DETECTION SYSTEM AND METHOD OF USING

RELATED APPLICATIONS

The present application is a National Phase of International Application No. PCT/US2022/021856, filed Mar. 25, 2022.

FIELD

This application relates to a system for detecting recurring alarms and a method of using the system.

BACKGROUND

A recurring alarm, also called an intermittent fault, is a result of a device or system malfunctioning at irregular intervals for a short duration. The device or system malfunction is resolved without intervention by a maintenance crew or a system monitor. Recurring alarms are difficult to reproduce due to the irregularity of the timing and resolution independent of external involvement. The difficulty in reproducing of the recurring alarms leads to difficulty in analyzing the recurring alarms.

SUMMARY

An aspect of this description relates to a system for identifying recurring alarms. The system includes a non-transitory computer readable medium configured to store instructions thereon. The system further includes a processor connected to the non-transitory computer readable medium. The processor is configured to execute the instructions for correlating an alarm log with a rule, wherein the alarm log comprises information related to a plurality of faults. The processor is further configured to execute the instructions for determining whether any of the plurality of faults satisfy all criteria of the rule. The processor is further configured to execute the instructions for identifying an earliest fault of the plurality of faults that satisfies all of the criteria of the rule in response to a determination that at least one fault of the plurality of faults satisfies all of the criteria of the rule. The processor is further configured to execute the instructions for comparing the earliest fault with an incident log. The processor is further configured to execute the instructions for generating an incident in response to a determination that the earliest fault does not match any open entry in the incident log. In some embodiments, the processor is further configured to execute the instructions for receiving the alarm log; and receiving the rule. In some embodiments, the processor is further configured to execute the instructions for receiving the rule from a user. In some embodiments, the processor is further configured to execute the instructions for determining whether to update a status of an open incident in the incident log in response to a determination that the earliest fault matches the open incident. In some embodiments, the processor is further configured to execute the instructions for updating the incident log to change the status of the open incident to closed in response to a determination to update the status of the open incident. In some embodiments, the processor is further configured to execute the instructions for updating a priority of the open incident in the incident log in response to a determination not to update the status of the open incident. In some embodiments, the processor is further configured to execute the instructions for transmitting instructions for resolving the earliest fault in response to generating the incident. In some embodiments, the criteria of the rule comprise information related to a monitoring period, an alarm code, an occurrence count, and an equipment type. In some embodiments, the processor is further configured to execute the instructions for recommending at least one of the criteria for the rule based on an analysis of the alarm log.

An aspect of this description relates to a method of identifying recurring alarms. The method includes correlating an alarm log with a rule, wherein the alarm log comprises information related to a plurality of faults. The method further includes determining whether any of the plurality of faults satisfy all criteria of the rule. The method further includes identifying an earliest fault of the plurality of faults that satisfies all of the criteria of the rule in response to a determination that at least one fault of the plurality of faults satisfies all of the criteria of the rule. The method further includes comparing the earliest fault with an incident log. The method further includes generating an incident in response to a determination that the earliest fault does not match any open entry in the incident log. In some embodiments, the method further includes receiving the alarm log; and receiving the rule. In some embodiments, receiving the rule includes receiving the rule from a user. In some embodiments, the method further includes determining whether to update a status of an open incident in the incident log in response to a determination that the earliest fault matches the open incident. In some embodiments, the method further includes updating the incident log to change the status of the open incident to closed in response to a determination to update the status of the open incident. In some embodiments, the method further includes updating a priority of the open incident in the incident log in response to a determination not to update the status of the open incident. In some embodiments, the method further includes transmitting instructions for resolving the earliest fault in response to generating the incident. In some embodiments, the criteria of the rule include information related to a monitoring period, an alarm code, an occurrence count, and an equipment type. In some embodiments, the method further includes recommending at least one of the criteria for the rule based on an analysis of the alarm log.

An aspect of this description relates to a non-transitory computer readable medium configured to store instructions thereon. The instructions when executed by a process cause the processor to correlate an alarm log with a rule, wherein the alarm log comprises information related to a plurality of faults. The instructions when executed by the process further cause the processor to determine whether any of the plurality of faults satisfy all criteria of the rule. The instructions when executed by the process further cause the processor to identify an earliest fault of the plurality of faults that satisfies all of the criteria of the rule in response to a determination that at least one fault of the plurality of faults satisfies all of the criteria of the rule. The instructions when executed by the process further cause the processor to compare the earliest fault with an incident log. The instructions when executed by the process further cause the processor to generate an incident in response to a determination that the earliest fault does not match any open entry in the incident log. In some embodiments, the instructions are further configured to cause the processor to transmit instructions for resolving the earliest fault in response to generating the incident.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Despite the short duration and independent resolution of recurring alarms, telecommunication networks experience thousands of recurring alarms. The large number of recurring alarms does have a noticeable impact on performance of the telecommunication network in some instances. In order to identify a cause of such an alarm, a system monitor would attempt to reproduce the alarm. However, recurring alarms have short durations and occur with irregularity, which makes reproduction of the alarms difficult. A lack of reproducibility makes recurring alarms difficult to identify an analyze to determine a long lasting resolution to an issue causing the recurring alarm.

In order to help reliably identify recurring alarms to determine a cause of a problem, the method described herein utilizes an analysis of an alarm log of a telecommunication system. A system monitor is also able to establish rules for identifying recurring alarms based on the data in the alarm log. The method is then able to identify the source of a recurring alarm and a long term resolution to the recurring alarm is able to be implemented. In some embodiments, the long term resolution includes instructing a maintenance crew to repair or replace a piece of hardware within the telecommunication system. In some embodiments, the long term resolution includes automatically, or through a system monitor, resetting of a piece of equipment within the telecommunication network. In some embodiments, the long term resolution includes updating code, or debugging, of the system. In some embodiments, multiple operations, such as those mentioned above are utilized in order to provide the long term resolution. A long term resolution means that an occurrence of the recurring alarm is eliminated or reduced in comparison to the performance of the system without the identification of the source of the alarm and intervention by the system monitor or maintenance crew. By reducing occurrences of recurring alarms, the overall telecommunication network performance increases and customer satisfaction with the telecommunication network improves.

Figure 1:
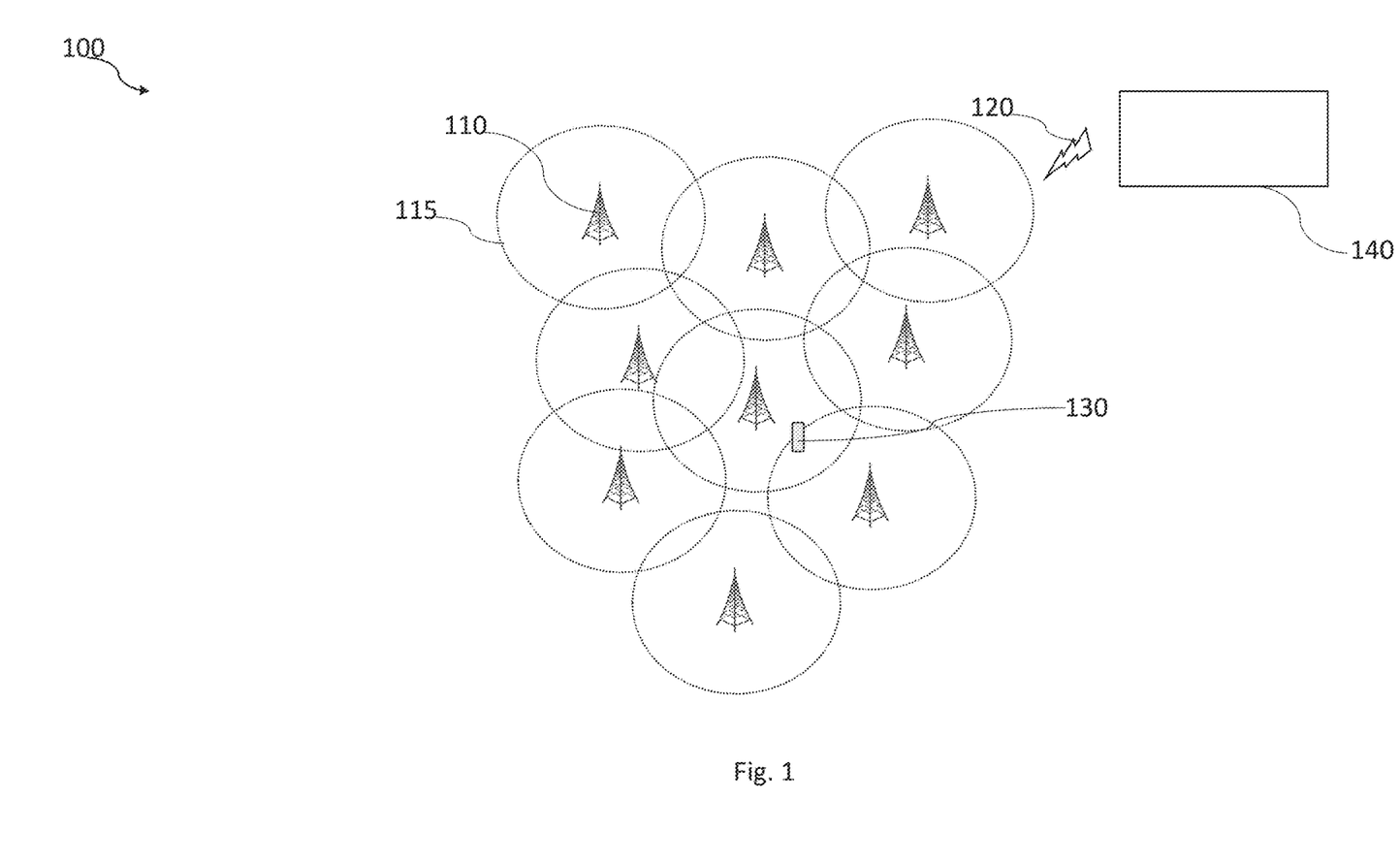
FIG. 1 is a view of a telecommunication network in accordance with some embodiments.

FIG. 1 is a diagram of a telecommunication network 100 in accordance with some embodiments. The telecommunication network 100 includes a plurality of base stations 110 and each base station 110 has a corresponding coverage area 115. In some instances, coverage areas 115 for neighboring base stations 110 overlap one another to define an overlapping coverage area. In some instances, a gap exists between coverage areas 115 of neighboring base stations 110. A mobile device 130 within the telecommunication network 100 is able to connect to one or more base station 110 when the mobile device 130 is within the coverage area 115 corresponding to the base station 110. A connection 120 is used to provide data, such as an alarm log, from the base stations 110 to a monitoring system 140. The monitoring system 140 is usable to monitor performance of the base stations 110 to help maintain a high quality service provided by the telecommunication network 100. In some embodiments, the connection 120 is a wireless connection. In some embodiments, the connection 120 is a wired connection.

A telecommunication service provider is responsible for maintaining the base stations 110 and minimizing a size and number of gaps in the coverage areas 115 of the telecommunication network 100. In some embodiments, the service provider becomes aware of a connectivity issue with the mobile device 130. In some embodiments, the service provider becomes aware of the connectivity issue through communication with a user of the mobile device 130. In some embodiments, the service provider becomes aware of the connectivity issue through monitoring of key performance indicators (KPIs) within the telecommunication network 100, or through other monitored parameters. If the mobile device 130 is within a gap of coverage areas 115, the service provider is likely to provide instructions for service or maintenance of one of more base stations 110 adjacent to the gap in order to reduce or remove the gap from the telecommunication network 100.

Using the connection 120 to monitor the performance of the base stations 110, the monitoring system 140 is able to collect data from the base stations 110, such as alarm logs. An alarm log includes historical information related to error or problems within the base station. The alarm log includes information such as an alarm code, which indicates what type of problem or error occurred, a time that the alarm was initially generated, a time at which the alarm ceased, or other suitable information. In some embodiments, the alarm log is received in response to a request issued by the monitoring system 140 to each of the base stations 110. In some embodiments, alarms are continually transmitted to the monitoring system 140 over the connection 120 and an alarm log is stored in the monitoring system 140.

In response to receiving an alarm, a user, such as a system monitor, is able to review the alarm, determine a process for resolving the problem or error, and issuing instructions to begin a resolution process. In some embodiments, the instructions include instructions transmitted directly to the base station 110 over the connection 120. Instructions such as restart commands, reset commands, software updates, or the like are able to be transmitted directly to the base station 110 to help resolve the problem or error. In some embodiments, the instructions are transmitted to a maintenance crew in order to physically address a problem at the base station 110. Instructions such as repair equipment, replace equipment, install new equipment, or the like are issued to maintenance crews that are then able to implement the instructions for helping to resolve the problem or error.

While the ability for the user to view and issue instructions for resolving an alarm is practical for many types of alarm, some alarms are short-lived and become resolved without intervention. These types of alarms are called recurring alarms. The user often does not notice recurring alarms because of the short duration of the alarm, as short as less than a minute in some instances. Also, since the alarm is resolved without intervention, the user does not generate instructions for addressing the recurring alarm. As a result, the recurring alarms are likely to continue to occur within the system without the problem or error generating the alarm being addressed. An accumulation of these recurring alarms does noticeably impact the performance of the telecommunication system 110; and leads to reduced customer satisfaction in some instances.

Figure 2:
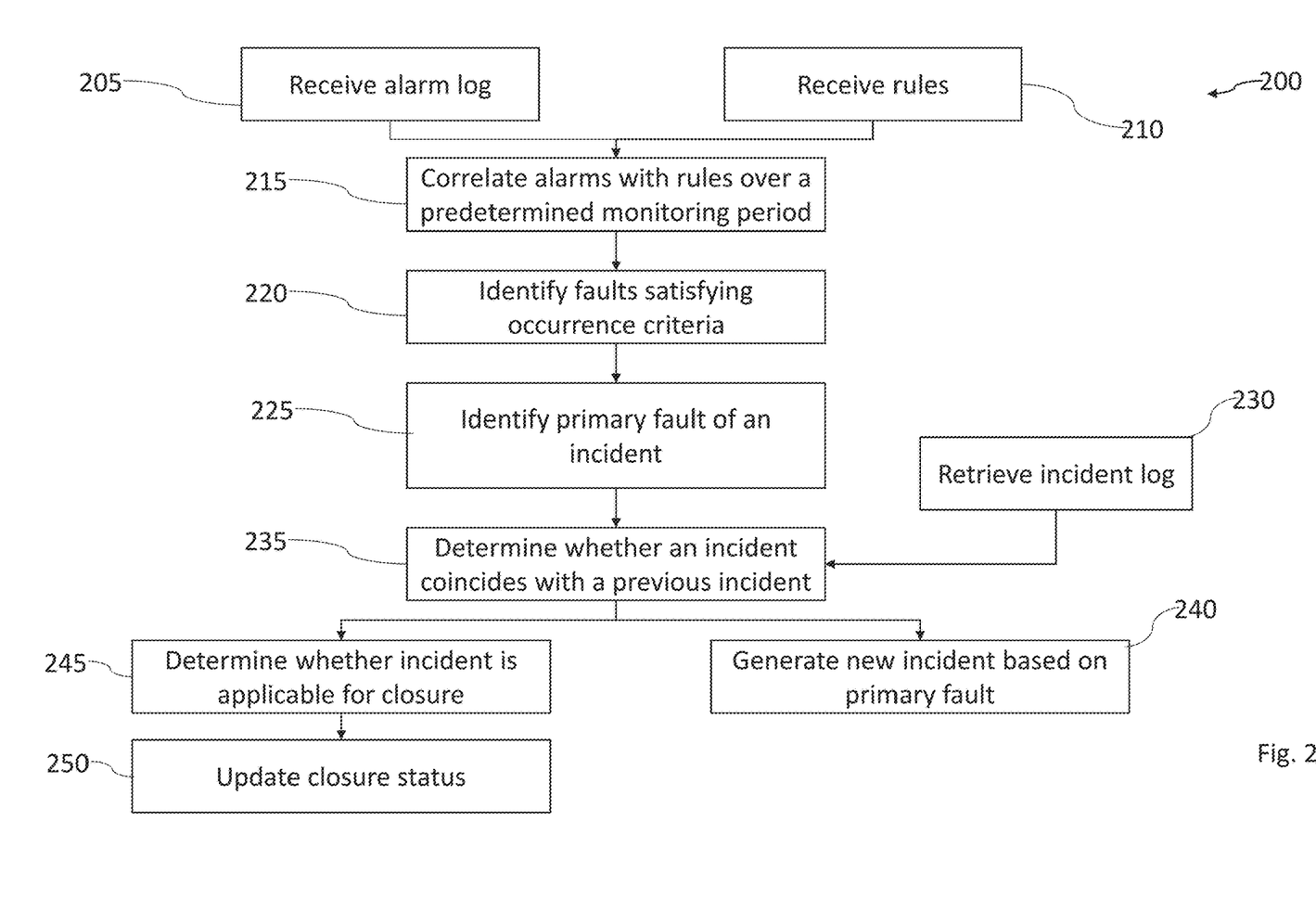
FIG. 2 is a flowchart of a method of identifying recurring alarms in accordance with some embodiments.

In order to help identify the recurring alarms, so that the recurring alarms are able to be addressed, the monitoring system 140 is configured to perform the method 200 (FIG. 2). Using the method 200, the monitoring system 140 is able to identify recurring alarms and issue instructions for resolution of the problem or error to help prevent the recurring alarm from continuing. In some embodiments, the monitoring system 140 is able to recognize a number of occurrences of an alarm code from a same base station 110 or piece of equipment that exceeds a predefined threshold within a specific time duration based on information from the alarm log. The predefined threshold is set based on a severity of the alarm code. That is, an alarm code that has a more significant impact on the telecommunication network 100 has a lower predefine threshold than an alarm code that has a lower impact on the telecommunication network 100. In some embodiments, the predefined threshold ranges from about 5 occurrences to about 20 occurrences. Similar to the predefined threshold, the specific time duration is also set based on the severity for an alarm code. That is, an alarm code that has a greater impact on the performance of the telecommunication network 100 has a shorter specific time duration than an alarm code which has a less impact on the performance of the telecommunication network 100. In some embodiments, the specific time duration ranges from about 4 hours to about 2 days.

In some embodiments, the monitoring system 140 is configured to display an interface, such as a graphical user interface (GUI), for receiving input information from the user. In some embodiments, the monitoring system 140 is configured to receive rule information from the user. The rule information is usable to define rules for identifying problems or errors within the telecommunication network 100. In some embodiments, the rules include information related to a corresponding alarm code. In some embodiments, the rules do not include information related to alarm codes. Using the rule information, the monitoring system 140 is able to review alarm logs to identify alarms which satisfy the criteria defined by the rules. The user is then able to use the monitoring system 140 to issue instructions for resolving the problems or errors associated with the identified alarms.

In response to identifying a recurring alarm, the monitoring system 140 is configured to generate an incident report. An incident report identifies the corresponding recurring alarm and includes instructions for attempting to resolve the identified recurring alarm. In some embodiments, the monitoring system 140 is configured to compare the generated incident report with currently open incident reports in order to determine whether to issue the instructions associated with the incident report. An open incident report means that an incident report has been generated, but the instructions for resolving the underlying alarm have not yet been implemented. In some embodiments, in response to a determination that the incident report matches an open incident report, the monitoring system 140 is configured to discard the most recently generated incident report. In some embodiments, in response to a determination that the incident report matches an open incident report, the monitoring system 140 is configured to increase a priority level of the previously generated incident report. In some embodiments, in response to a determination that no incident report matches the generated incident report, the monitoring system 140 is configured to issue the instructions associated with the incident report. In some embodiments, the instructions include an alert. In some embodiments, the alert includes an audio or visual alert. In some embodiments, the instructions cause a device receiving the instructions, such as a mobile device, to automatically display the alert in response to receiving the instructions.

Figure 3:
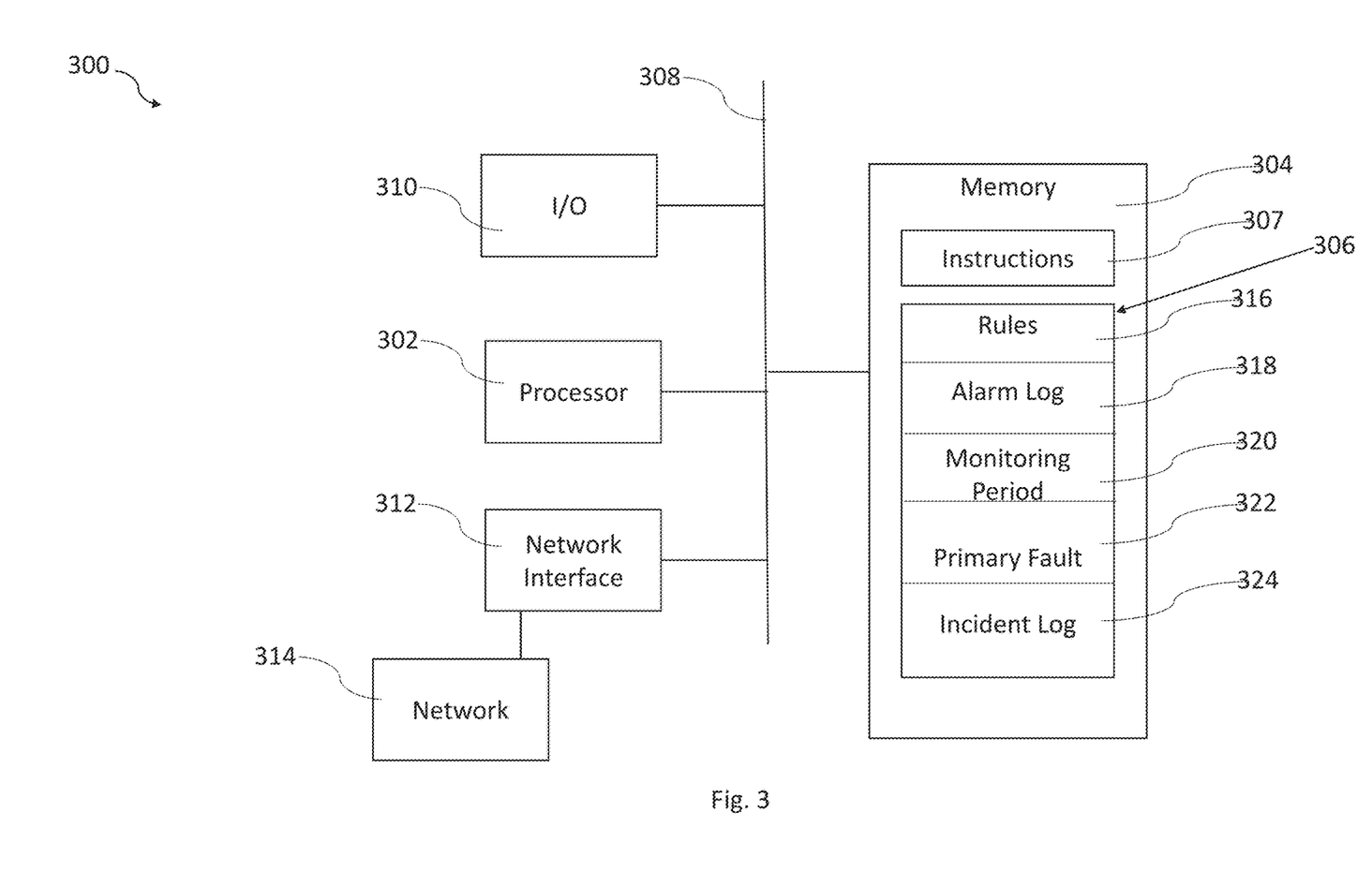
FIG. 3 is a diagram of a system for identifying recurring alarms in accordance with some embodiments.

FIG. 2 is a flowchart of a method 200 of identifying recurring alarms in accordance with some embodiments. In some embodiments, the method 200 is implemented using the monitoring system 140 (FIG. 1). In some embodiments, the method 200 is implemented using the system 300 (FIG. 3). The method 200 assists in the identification of recurring alarms within a telecommunication network, such as telecommunication network 100 (FIG. 1), in order to help resolve the recurring alarms to improve the performance of the telecommunication network.

In operation 205, an alarm log is received. In some embodiments, the alarm log is received from one or more base stations, e.g., base stations 110 (FIG. 1), connected to a monitoring system, e.g., monitoring system 140 (FIG. 1). In some embodiments, alarms are received from one or more base stations, e.g., base stations 110 (FIG. 1), connected to the monitoring system, e.g., monitoring system 140 (FIG. 1), and the monitoring system is configured to store the alarms in an alarm log. In some embodiments, the alarm log is received wirelessly. In some embodiments, the alarm log is received via a wired connection. The alarm log includes information related to errors or problems, also called faults, within the telecommunication system. The alarm log includes time information indicating when the alarm was initiated. In some embodiments, the alarm log further includes alarm code information identifying the fault which caused the alarm. In some embodiments, the alarm log includes information related to when the alarm ceased. In some embodiments, the alarm log includes a table format. In some embodiments, the alarm log is searchable.

In some embodiments, the alarm log is received automatically at predetermined intervals. In some embodiments, the predetermined intervals are set based on a determined quality of service of the telecommunication network determined based on one or more measured KPIs of the telecommunication network. For example, in some embodiments, in response to a determination that the telecommunication network is operating at a high quality of service, the predetermined intervals are longer than when the telecommunication network is operating at a low quality of service. Factoring the quality of service of the telecommunication network into the predetermined interval helps to improve efficiency of monitoring and maintaining the telecommunication network. In a situation where the quality of service is low, customer satisfaction is more likely to be negatively impacted. Therefore, a more rapid response is desired in order to maintain or improve customer satisfaction with the telecommunication network. On the contrary, when the quality of service of the telecommunication network is high, spending resources on repair or replacement operations is inefficient.

In operation 210, one or more rules are received. In some embodiments, the rules are received based on user input at the monitoring system, e.g., the monitoring system 140 (FIG. 1). For example, in some embodiments, the user is able to enter criteria for identifying a recurring alarm into a GUI of the monitoring system. In some embodiments, the rule includes a monitoring period, an alarm code, an occurrence count, an equipment type, or other suitable information. The monitoring period is a duration over which the occurrences of the alarm code should be counted. The alarm code is an indication of a type of fault occurring within the telecommunication system. The occurrence count is a time of times the alarm code was identified within the monitoring period. The equipment type includes information related to a level of impact the equipment has on the telecommunication network, such as macro, network, or other suitable equipment type. In some embodiments, the monitoring period ranges from about 10 minutes to about 6 hours. A longer monitoring period helps to provide more data to reliably identify a recurring alarm. However, a longer monitoring period also causes more processing load on the monitoring system. In at least one embodiment, a sample rule includes a monitoring period of 30 minutes; an alarm code of 1055; an occurrence count of 10; and an equipment type of macro. In at least one embodiment, a sample rule includes a monitoring period of 100 minutes; an alarm code indicating high memory usage; an occurrence count of 3; and an equipment type of macro. In this type of rule for a single domain or vendor, if the system identifies a high memory usage alarm 3 times within 100 minutes, the system will create a correlation for all of the alarms satisfying the conditions for the rule. In at least one embodiment, a sample rule includes a monitoring period of 50 minutes; an alarm code indicating hardware failure; an occurrence count of 5; and an equipment type of macro. In this type of rule for a single domain or vendor, if the system identifies a hardware failure alarm 5 times within 50 minutes, the system will create a correlation for all of the alarms satisfying the conditions for the rule.

In some embodiments, the monitoring system recommends at least a portion of the rule based on an analysis of the alarm log. For example, in some embodiments, in response to the monitoring system identifying a common alarm code, the monitoring system will recommend to the user to create a rule based on the common alarm code. In some embodiments, the monitoring system recommend an equipment type for a rule. For example, in some embodiments, in response to the alarm log indicating problems or errors with a specific equipment type, the monitoring system will recommend that the user generate a rule with respect to the specific equipment type. In some embodiments, the recommendation from the monitoring system includes an alert, such as an audio or visual alert. In some embodiments, the recommendation causes the alert to automatically appear on a device, such as a mobile device, accessible by the user. In some embodiments, the alert includes an ability of the user to accept or decline the recommendation.

In operation 215, the alarms from the alarm log are correlated with the rules over a predetermined review period. The predetermined review period is a duration over which the alarm log spans. In some embodiments, the predetermined review period is not equal to the monitoring period from the rule defined in operation 210. In some embodiments, the predetermine review period is equal to the monitoring period form the rule define in operation 210. In some embodiments, the predetermined review period is determined based on an acceptable processing load on the monitoring system, e.g., monitoring system 140 (FIG. 1). In some embodiments, the predetermined review period ranges from about 12 hours to about 1 week. In some embodiments, the predetermined review period is set by the user, e.g., by entering information into the monitoring system. In some embodiments, the monitoring system is configured to recommend a predetermined view period based on a processing load of the monitoring system.

In some embodiments, the predetermined review period is based on a duration for which alarm log data is available. For example, in some embodiments, due to memory storage capacity, the alarm log data is overwritten after a predetermined time lapse; and the predetermined review period is set to be shorter than the predetermined time lapse to help maintain precision of the correlation in operation 215.

In operation 220, faults satisfying the rules are identified based on the correlation performed in operation 215. The monitoring system determines what, if any, faults satisfy all of the conditions of any one rule. In some embodiments, in response to a determination that no faults satisfy the conditions of any rule, the method 200 ceases. In some embodiments, in response to a determination that no faults satisfy the conditions of any rule, the method 200 returns to operation 215 and is repeated until a fault is identified as satisfying at least one rule. In some embodiments, in response to a determination that no faults satisfy the conditions of any rule, the method 200 pauses and is implemented again at a later time following a predetermined delay interval; in response to receiving a new rule from the user; in response to a request from the user to implement the method 200 again; or in response to another suitable condition. In some embodiments, the predetermined delay interval is based on a processing load of the monitoring system, e.g., monitoring system 140 (FIG. 1).

In operation 225, a primary fault is identified based on the results of operation 220 based on a minimum time. The primary fault is a first occurrence of a fault identified in operation 220. The primary fault is an earliest instance of the error or problem that caused the alarms determined to satisfy the rule. The earliest instance is likely to be the source of the problem or errors. As a result, resolving the primary fault is likely to resolve subsequent alarms generated for similar reasons. Identifying the primary fault helps to reduce processing load on the monitoring system, e.g., the monitoring system 140 (FIG. 1); and to reduce repetitive and potentially unnecessary work to resolve the alarms.

In operation 230, an incident log is received. The incident log is a listing of currently open incidents. In some embodiments, the incident log is stored within the monitoring system, e.g., monitoring system 140 (FIG. 1). In some embodiments, the incident log is retrieved from an external device, such as a server. An incident includes instructions for resolving a primary fault identified in previous iterations of the method 200; or instructions for resolving another fault. The incident log includes a status of each of the listed incidents. In some embodiments, the incident is listed as either open or closed. An open incident indicates that the instructions have not been completed. In some embodiments, the incident indicates that the instructions have not begun to be implemented. In some embodiments, a closed incident indicates that the instructions have been completed. In some embodiments, a closed incident indicates that the fault has been resolved. In some embodiments, the incident log is retrieved wirelessly. In some embodiments, the incident log is retrieved via a wired connection.

In operation 235, a determination is made regarding whether the primary fault identified in operation 225 matches any of the open incidents in the retrieved incident log. In some embodiments, the operation 235 further includes determining whether the work on the instructions associated with a matching incident from the incident log has begun. In some embodiments, in response to a determination that a match exists between the incident log and the identified primary fault, a priority level of the incident is increased. In response to a determination that a match between the identified primary fault and the incident log exists, the method 200 proceeds to operation 245. In response to a determination that no match between the identified primary fault and the incident log exists, the method 200 proceeds to operation 240.

In operation 240, a new incident is generated based on the primary fault identified in operation 225. The incident includes instructions for resolving the primary fault. In some embodiments, the instructions are input by a user of the monitoring system, e.g., monitoring system 140 (FIG. 1). In some embodiments, the instructions are generated based on an alarm code associated with the primary fault. In some embodiments, the instructions are automatically transmitted to either the user or a maintenance crew for implementing the instructions. In some embodiments, the instructions are transmitted wirelessly. In some embodiments, the instructions are transmitted via a wired connection. In some embodiments, the instructions cause a device, such as a mobile device, accessible by the user or maintenance crew to automatically display an alert, such as an audio or visual alert, upon receipt of the instructions. In some embodiments, the incident is placed in a queue for processing based on a priority level of the incident. In some embodiments, the priority level of the incident is set based on a type of alarm code associated with the primary fault. In some embodiments, the priority level of the incident is set based on an equipment type of the primary fault. In some embodiments, multiple criteria are utilized to determine the priority level of the incident. The incident generated in operation 240 is used to update the incident log for future iterations of the method 200.

In operation 245, a determination is made regarding whether to update a status of the incident matching the identified primary fault. The determination is made regarding whether to update the status based on review of the alarm log. In some embodiments, the alarm log is reviewed to determine whether the alarm is continuing to occur. In response to a determination that the alarm is continuing to occur, the incident matching the identified primary fault remains open; and the method 200 returns to operation 215; pauses; or ceases, as described above with respect to operation 215. In response to a determination that the alarm is not continuing to occur, the method 200 proceeds to operation 250.

In operation 250, the status of the incident matching the identified primary fault is changed to closed. The change in the status is stored in the incident log. Based on the change of the status to closed, the incident will no longer be used in operation 235 to determine whether later identified primary faults correspond to an open incident. Thus, if the primary fault begins again at a later time a new incident will be generated.

One of ordinary skill in the art would understand that the current application is not limited to the explicitly described operations in method 200. In some embodiments, the method 200 includes additional operations. For example, in some embodiments, the method 200 includes transmittal of the incident to a maintenance crew to replace or repair a component of the telecommunication network associated with the identified primary fault. In some embodiments, at least one operation of the method 200 is omitted. For example, in some embodiments, a functionality of the operation 220 is incorporated into operation 215 and the operation 220 is omitted as a separate step. In some embodiments, an order of operations of the method 200 is changed. For example, in some embodiments, the operation 230 is performed prior to the operation 215. One of ordinary skill in the art would recognize that other modifications are also within the scope of this description.

FIG. 3 is a diagram of a system 300 for identifying recurring alarms in accordance with some embodiments. System 300 includes a hardware processor 302 and a non-transitory, computer readable storage medium 304 encoded with, i.e., storing, the computer program code 306, i.e., a set of executable instructions. Computer readable storage medium 304 is also encoded with instructions 307 for interfacing with external devices, such as base stations 110 (FIG. 1), servers, mobile devices, or other suitable external devices. The processor 302 is electrically coupled to the computer readable storage medium 304 via a bus 308. The processor 302 is also electrically coupled to an input/output (I/O) interface 310 by bus 308. A network interface 312 is also electrically connected to the processor 302 via bus 308. Network interface 312 is connected to a network 314, so that processor 302 and computer readable storage medium 304 are capable of connecting to external elements via network 314. The processor 302 is configured to execute the computer program code 306 encoded in the computer readable storage medium 304 in order to cause system 300 to be usable for performing a portion or all of the operations as described in method 200 (FIG. 2) or with respect to telecommunication network 100 (FIG. 1).

In some embodiments, the processor 302 is a central processing unit (CPU), a multi-processor, a distributed processing system, an application specific integrated circuit (ASIC), and/or a suitable processing unit.

In some embodiments, the computer readable storage medium 304 is an electronic, magnetic, optical, electromagnetic, infrared, and/or a semiconductor system (or apparatus or device). For example, the computer readable storage medium 504 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 304 includes a compact disk-read only memory (CD-ROM), a compact disk-read/write (CD-R/W), and/or a digital video disc (DVD).

In some embodiments, the storage medium 304 stores the computer program code 306 configured to cause system 300 to perform a portion or all of the operations as described in method 200 (FIG. 2) or with respect to telecommunication network 100 (FIG. 1). In some embodiments, the storage medium 304 also stores information needed for performing a portion or all of the operations as described in method 200 (FIG. 2) or with respect to telecommunication network 100 (FIG. 1) as well as information generated during performing a portion or all of the operations as described in method 200 (FIG. 2) or with respect to telecommunication network 100 (FIG. 1), such as a rules parameter 316, an alarm log parameter 318, a monitoring period parameter 320, primary fault parameter 322, an incident log parameter 324 and/or a set of executable instructions to perform a portion or all of the operations as described in method 200 (FIG. 2) or with respect to telecommunication network 100 (FIG. 1).

In some embodiments, the storage medium 304 stores instructions 307 for interfacing with external devices. The instructions 307 enable processor 302 to generate instructions readable by the external devices to effectively implement a portion or all of the operations as described in method 200 (FIG. 2) or with respect to telecommunication network 100 (FIG. 1).

System 300 includes I/O interface 310. I/O interface 310 is coupled to external circuitry. In some embodiments, I/O interface 310 includes a keyboard, keypad, mouse, trackball, trackpad, and/or cursor direction keys for communicating information and commands to processor 302.

System 300 also includes network interface 312 coupled to the processor 302. Network interface 312 allows system 300 to communicate with network 314, to which one or more other computer systems are connected. Network interface 312 includes wireless network interfaces such as BLUETOOTH, WIFI, WIMAX, GPRS, or WCDMA; or wired network interface such as ETHERNET, USB, or IEEE-1394. In some embodiments, a portion or all of the operations as described in method 200 (FIG. 2) or with respect to telecommunication network 100 (FIG. 1) is implemented in two or more systems 300, and information such as rules, alarm log, monitoring period, primary fault, or incident log is exchanged between different systems 300 via network 314.

An aspect of this description relates to a system for identifying recurring alarms. The system includes a non-transitory computer readable medium configured to store instructions thereon. The system further includes a processor connected to the non-transitory computer readable medium. The processor is configured to execute the instructions for correlating an alarm log with a rule, wherein the alarm log comprises information related to a plurality of faults. The processor is further configured to execute the instructions for determining whether any of the plurality of faults satisfy all criteria of the rule. The processor is further configured to execute the instructions for identifying an earliest fault of the plurality of faults that satisfies all of the criteria of the rule in response to a determination that at least one fault of the plurality of faults satisfies all of the criteria of the rule. The processor is further configured to execute the instructions for comparing the earliest fault with an incident log. The processor is further configured to execute the instructions for generating an incident in response to a determination that the earliest fault does not match any open entry in the incident log. In some embodiments, the processor is further configured to execute the instructions for receiving the alarm log; and receiving the rule. In some embodiments, the processor is further configured to execute the instructions for receiving the rule from a user. In some embodiments, the processor is further configured to execute the instructions for determining whether to update a status of an open incident in the incident log in response to a determination that the earliest fault matches the open incident. In some embodiments, the processor is further configured to execute the instructions for updating the incident log to change the status of the open incident to closed in response to a determination to update the status of the open incident. In some embodiments, the processor is further configured to execute the instructions for updating a priority of the open incident in the incident log in response to a determination not to update the status of the open incident. In some embodiments, the processor is further configured to execute the instructions for transmitting instructions for resolving the earliest fault in response to generating the incident. In some embodiments, the criteria of the rule comprise information related to a monitoring period, an alarm code, an occurrence count, and an equipment type. In some embodiments, the processor is further configured to execute the instructions for recommending at least one of the criteria for the rule based on an analysis of the alarm log.

An aspect of this description relates to a method of identifying recurring alarms. The method includes correlating an alarm log with a rule, wherein the alarm log comprises information related to a plurality of faults. The method further includes determining whether any of the plurality of faults satisfy all criteria of the rule. The method further includes identifying an earliest fault of the plurality of faults that satisfies all of the criteria of the rule in response to a determination that at least one fault of the plurality of faults satisfies all of the criteria of the rule. The method further includes comparing the earliest fault with an incident log. The method further includes generating an incident in response to a determination that the earliest fault does not match any open entry in the incident log. In some embodiments, the method further includes receiving the alarm log; and receiving the rule. In some embodiments, receiving the rule includes receiving the rule from a user. In some embodiments, the method further includes determining whether to update a status of an open incident in the incident log in response to a determination that the earliest fault matches the open incident. In some embodiments, the method further includes updating the incident log to change the status of the open incident to closed in response to a determination to update the status of the open incident. In some embodiments, the method further includes updating a priority of the open incident in the incident log in response to a determination not to update the status of the open incident. In some embodiments, the method further includes transmitting instructions for resolving the earliest fault in response to generating the incident. In some embodiments, the criteria of the rule include information related to a monitoring period, an alarm code, an occurrence count, and an equipment type. In some embodiments, the method further includes recommending at least one of the criteria for the rule based on an analysis of the alarm log.

An aspect of this description relates to a non-transitory computer readable medium configured to store instructions thereon. The instructions when executed by a process cause the processor to correlate an alarm log with a rule, wherein the alarm log comprises information related to a plurality of faults. The instructions when executed by the process further cause the processor to determine whether any of the plurality of faults satisfy all criteria of the rule. The instructions when executed by the process further cause the processor to identify an earliest fault of the plurality of faults that satisfies all of the criteria of the rule in response to a determination that at least one fault of the plurality of faults satisfies all of the criteria of the rule. The instructions when executed by the process further cause the processor to compare the earliest fault with an incident log. The instructions when executed by the process further cause the processor to generate an incident in response to a determination that the earliest fault does not match any open entry in the incident log. In some embodiments, the instructions are further configured to cause the processor to transmit instructions for resolving the earliest fault in response to generating the incident.

A non-limiting example of this system includes a server, accessible by a user, configured to receive information related to a telecommunication network. The information includes alarm codes for components within the telecommunication network. For example, an enhance nodeB (eNB) transmits a series of alarms indicating hardware failure. The user is able to develop rules for correlating alarms received from the telecommunication network. The rules are developed based on a knowledge of the telecommunication network. In some embodiments, the server is able to provide some recommendations for rules to the user. For example, the user is able to develop a rule that correlates hardware failure alarms based on receipt of 7 alarms being received within 30 minutes. Based on the received alarm codes and the generated rules, the server is able to correlate the alarms into a single incident for a component within the telecommunication network to be repaired or replaced. In response to the alarms and rules indicating that a correlation should be performed, the server checks to determine whether an incident has already been generated for the specific correlation identified by the system. Based on the results of the determination, the server is able to either generate a new incident, if no pre-existing incident exists, or analyze the existing incident, if an existing incident exists. The server is able to review a status of the existing incident or update a priority level of the incident. Using the correlation rules, the server is able to avoid creating multiple service tickets for the same problem, which improves efficiency in repairing or maintaining the telecommunication network.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A system for identifying recurring alarms, wherein the system comprises:
a non-transitory computer readable medium configured to store instructions thereon; and
a processor connected to the non-transitory computer readable medium, wherein the processor is configured to execute the instructions for:
receiving an alarm log from a base station of a wireless network;
receiving a correlation between the alarm log and a rule, wherein the alarm log comprises information related to a plurality of faults;
receiving a result of a determination indicating whether any of the plurality of faults satisfy all criteria of the rule;
identifying an earliest fault of the plurality of faults that satisfies all of the criteria of the rule in response to a determination that at least one fault of the plurality of faults satisfies all of the criteria of the rule;
generating an incident in response to a determination that the earliest fault does not match any open entry in an incident log; and
transmitting instructions for resolving the earliest fault to the base station based on the generated incident to cause the base station to implement the instructions, wherein at least one of a state, a setting, or software of the base station is changed as a result of the implementation of the instructions.

2. The system of claim 1, wherein the processor is further configured to execute the instructions for:
receiving the rule, wherein the rule is usable to identify the recurring alarms based on a combination of a severity level of an alarm code and a frequency of the alarm code in the alarm log.

3. The system of claim 1, wherein the processor is further configured to execute the instructions for:
controlling the base station to implement at least one of a restart of the base station, a resetting of the base station, or a software update on the base station.

4. The system of claim 1, wherein the processor is further configured to execute the instructions for:
determining whether to update a status of an open incident in the incident log in response to a determination that the earliest fault matches the open incident.

5. The system of claim 4, wherein the processor is further configured to execute the instructions for:
updating the incident log to change the status of the open incident to closed in response to a determination to update the status of the open incident.

6. The system of claim 4, wherein the processor is further configured to execute the instructions for:
updating a priority of the open incident in the incident log in response to a determination not to update the status of the open incident.

7. The system of claim 1, wherein the processor is further configured to execute the instructions for:
correlating the alarm log with the rule by analyzing a number of times an alarm code occurs within a predefined monitoring period, wherein the predetermined monitoring period ranges from 30 minutes to 100 minutes.

8. The system of claim 1, wherein the processor is further configured to execute the instructions for:
dispatching a maintenance crew to physically repair the base station.

9. The system of claim 1, wherein the processor is further configured to execute the instructions for:
recommending at least one of the criteria for the rule based on an analysis of the alarm log.

10. A method of identifying recurring alarms, wherein the method comprises:
receiving an alarm log from a base station of a wireless network;
receiving a correlation between the alarm log and a rule, wherein the alarm log comprises information related to a plurality of faults;
receiving a result of a determination indicating whether any of the plurality of faults satisfy all criteria of the rule;
identifying an earliest fault of the plurality of faults that satisfies all of the criteria of the rule in response to a determination that at least one fault of the plurality of faults satisfies all of the criteria of the rule;
generating an incident in response to a determination that the earliest fault does not match any open entry in an incident log; and
transmitting instructions for resolving the earliest fault to the base station based on the generated incident to cause the base station to implement the instructions, wherein at least one of a state, a setting, or software of the base station is changed as result of the implementation of the instructions.

11. The method of claim 10, further comprising:
receiving the rule, wherein the rule identifies the recurring alarms based on a combination of a severity level of an alarm code and a frequency of the alarm code in the alarm log.

12. The method of claim 10, further comprising controlling the base station to implement at least one of a restart of the base station, a resetting of the base station, or a software update on the base station.

13. The method of claim 10, further comprising:
determining whether to update a status of an open incident in the incident log in response to a determination that the earliest fault matches the open incident.

14. The method of claim 13, further comprising:
updating the incident log to change the status of the open incident to closed in response to a determination to update the status of the open incident.

15. The method of claim 13, further comprising:
updating a priority of the open incident in the incident log in response to a determination not to update the status of the open incident.

16. The method of claim 10, wherein
correlating the alarm log with the rule comprises analyzing a number of times an alarm code occurs within a predefined monitoring period, wherein the predetermined monitoring period ranges from 30 minutes to 100 minutes.

17. The method of claim 10, further comprising physically repairing the base station based on the generated incident.

18. The method of claim 10, further comprising:
recommending at least one of the criteria for the rule based on an analysis of the alarm log.

19. A non-transitory computer readable medium configured to store instructions thereon that when executed by a process cause the processor to:
receive an alarm log from a base station of a wireless network;
receive a correlation between the alarm log and a rule, wherein the alarm log comprises information related to a plurality of faults;
receive a result of a determination indicating whether any of the plurality of faults satisfy all criteria of the rule;
identify an earliest fault of the plurality of faults that satisfies all of the criteria of the rule in response to a determination that at least one fault of the plurality of faults satisfies all of the criteria of the rule;
generate an incident in response to a determination that the earliest fault does not match any open entry in an incident log; and
transmit instructions for resolving the earliest fault to the base station based on the generated incident to cause the base station to implement the instructions, wherein at least one of a state, a setting, or software of the base station is changed as a result of the implementation of the instructions.

20. The non-transitory computer readable medium of claim 19, wherein the instructions are further configured to cause the processor to:
control the base station to implement at least one of a restart of the base station, a resetting of the base station, or a software update on the base station.

* * * * *